United States Patent [19]

Stoev et al.

[11] 4,088,716

[45] May 9, 1978

[54] MATERIAL TREATING APPARATUS INCLUDING PNEUMO-HYDRAULIC VIBRATOR

[75] Inventors: Stoycho Mitrev Stoev; Metodi Stoyanov Metodiev; Lyubomir Vladimirov Kuzev; Petko Georgiev Vedrichkov; Ivan Mitrev Sapunarov; Vassil Vladimirov Vassilev; Spas Petrov Dimitrov; Vihar Assenov Gasharov; Sheko Kolev Russev; Kostadin Georgiev Mitrev, all of Sofia, Bulgaria

[73] Assignee: Vish Minno-Geoloshki Institute- Nis, Sofia, Bulgaria

[21] Appl. No.: 717,094

[22] Filed: Aug. 24, 1976

Related U.S. Application Data

[63] Continuation-in-part of Ser. No. 572,457, Apr. 28, 1975, abandoned.

[51] Int. Cl.² ............................................. C02D 1/00
[52] U.S. Cl. .................................... 261/64 R; 261/81; 261/123
[58] Field of Search ................ 261/114 VT, 123, 126, 261/64 R, 64 B, 81, 82

[56] References Cited

U.S. PATENT DOCUMENTS

| | | | |
|---|---|---|---|
| 2,428,889 | 10/1947 | Nutter | 261/114 A |
| 2,638,381 | 5/1953 | Paxton | 261/64 |
| 2,658,737 | 11/1953 | Nutter | 261/114 VT X |
| 2,783,884 | 3/1957 | Schaub | 261/123 X |

Primary Examiner—William A. Cuchlinski, Jr.

[57] ABSTRACT

Material treating apparatus including one or more pneumo-hydraulic vibrators. The apparatus includes a container with cells separated by at least one valve lying on a supporting frame, the valve having a movable valve element which is urged toward its valve-closed position by the hydrostatic pressure and optionally also by springs. On one side of the valve there is an air cell connected with a source of air under pressure, and on the other side of the valve there is a second cell containing a liquid or a liquid suspension of material to be treated. When the air cell is subjected to air under pressure, the movable valve element vibrates and generates intensive vibro-pulsation turbulent streams in the liquid material in the second cell.

6 Claims, 9 Drawing Figures

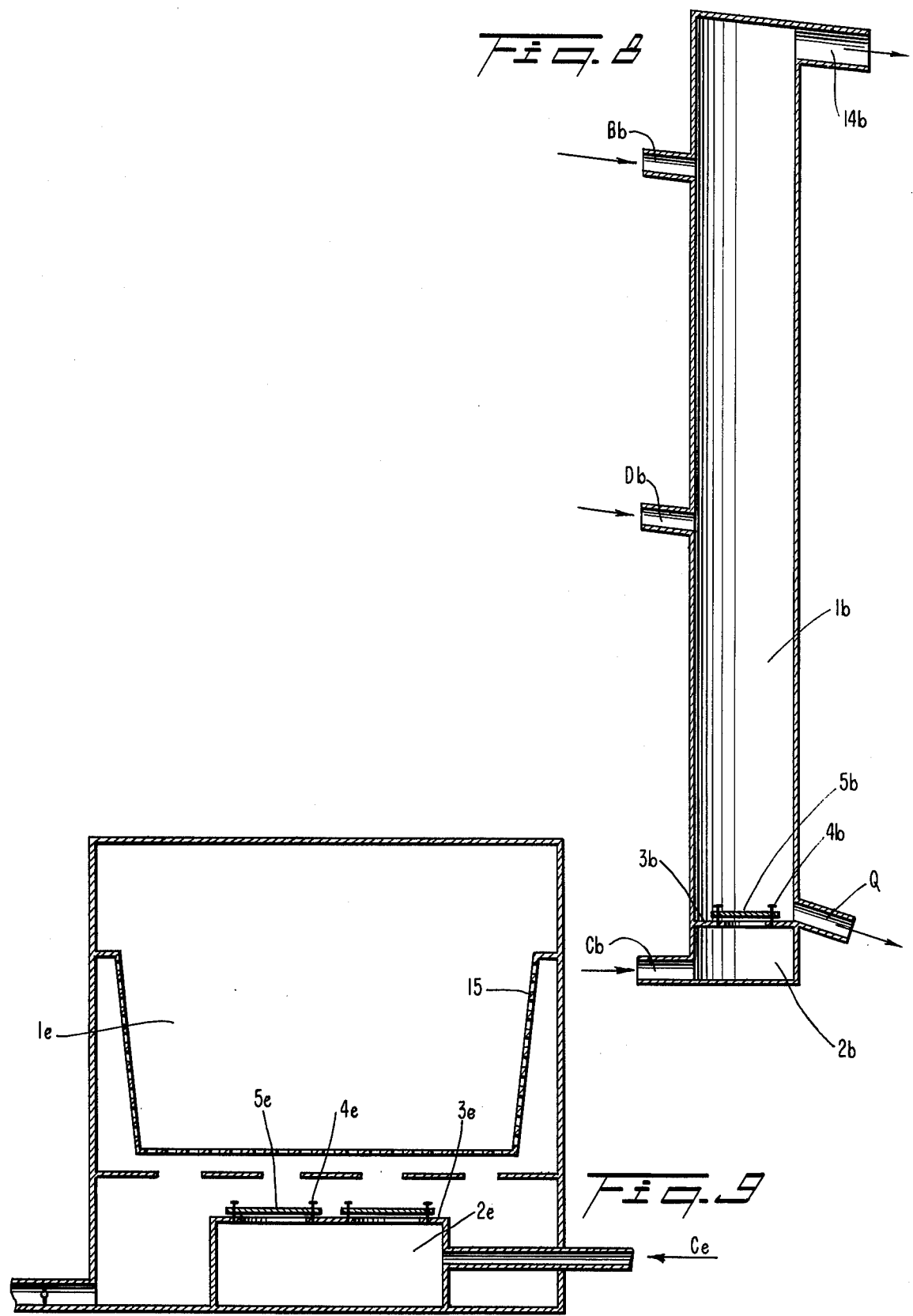

MATERIAL TREATING APPARATUS INCLUDING PNEUMO-HYDRAULIC VIBRATOR

CROSS-REFERENCE TO RELATED APPLICATION

This application is a continuation-in-part of our copending application Ser. No. 572,457, filed on Apr. 28, 1975 now abandoned.

This application is related to our copending and coassigned applications Ser. No. 572,342; Ser. No. 572,456 and Ser. No. 572,095 all of which were filed on Apr. 28, 1975.

BACKGROUND OF THE INVENTION

This invention relates to material treating apparatus including at least one pneumo-vibrator for generating intensive vibro-pulsating turbulent streams in a liquid or a liquid-solid material suspension to be treated.

During the last few years a number of vibrator constructions have been developed in order to intensity production processes including the treatment of liquids or liquid-solid material suspensions. In some cases these known constructions contribute to a considerable increase of the efficiency of the technologies employed in the material treating process. Their disadvantage is that they involve vibrators, which makes the construction of the apparatus more expensive. Maintenance of such vibrators is also expensive. Such known vibrators are used to produce intensive vibrations. However, there are some technologies which cannot be intensified by the use of low-intensity vibrations. Some processes are known, on the other hand, to which intensive vibration should not be applied. Thus, attempts to construct washing machines for household appliances using intensive vibrations proved unsuccessful because of their short useful life due to breaking of the vessels.

SUMMARY OF THE INVENTION

The present invention has among its objects the provision of a pneumo-hydraulic vibrator of simple construction which allows the generation of intensive vibro-pulsation turbulent streams, such vibrator being reliable in operation and simple to maintain. The vibrator of the invention is operated by either compressed air or sucked air, that is, air under reduced pressure; such air is often necessary for a given process. The pneumo-hydraulic vibrator devices based on these principles are called "self-vibration vibrators."

BRIEF DESCRIPTION OF THE DRAWINGS

A number of embodiments of material treating apparatus of the invention, such embodiments incorporating the pneumo-hydraulic vibrator of the invention, are shown in the accompanying drawings, in which:

FIG. 8 is a schematic view in vertical cross-section through a fifth embodiment of apparatus in accordance with the invention, such apparatus being a column flotation machine;

FIG. 9 is a schematic view in vertical cross-section through a sixth embodiment of apparatus in accordance with the invention, such apparatus being a washing device for domestic and industrial purposes.

DETAILED DESCRIPTION

Figure 1:
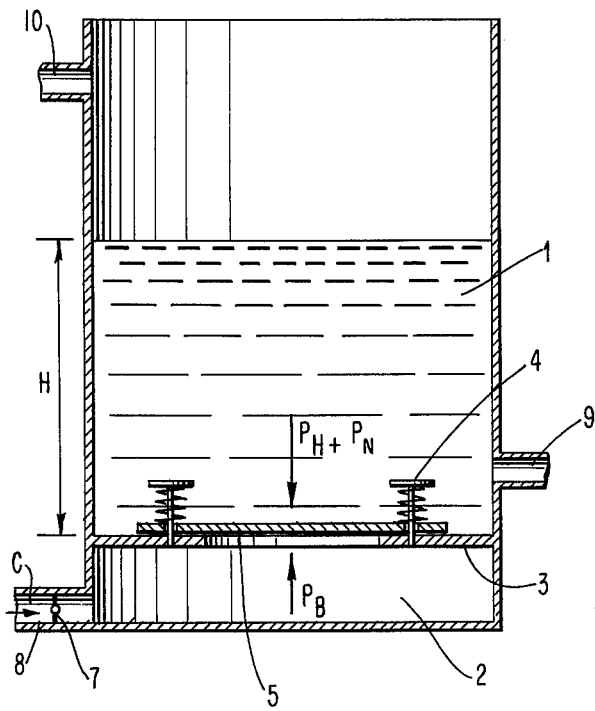
FIG. 1 is a view in vertical cross-section through a working cell provided with a pneumo-hydraulic self-vibrating device in accordance with the invention, the valve element of the vibrating device being shown in closed position.
Figure 2:
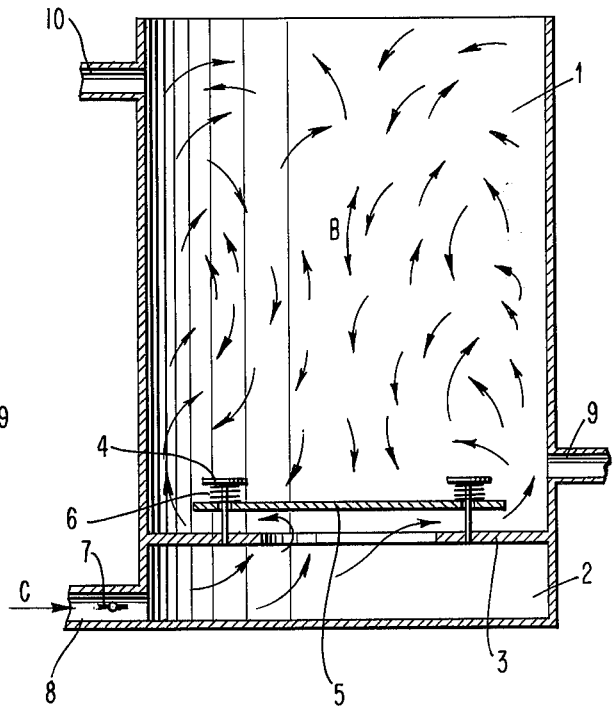
FIG. 2 is a view similar to FIG. 1 but with the valve element of the vibrating device being shown in open position.

FIGS. 1 and 2 illustrate the principle and manner of operation of the pneumo-hydraulic self-vibrating device of the invention. A working cell 1 in the form of a tank containing liquid is disposed above an air cell 2 into which compressed air, designated C, enters through a conduit means 8 having a pressure regulating valve 7 interposed therein. At the top of the air cell 2 there are horizontal supporting members 3 which are disposed in the same plane and extend inwardly of the cell from the side walls thereof. The space between the supports 3 is spanned by a play-like movable valve element 5 which is mounted on vertical adjustable guide screws 4 which pass freely through holes in the valve element 5. Coil compression springs 6 may be optionally provided. These springs 6 extend between the valve element 5 and heads on the screw guides 4 and constantly urge the element 5 toward the closed position thereof shown in FIG. 1. Liquid or a liquid-solid material suspension is introduced into the top of the working cell 1 through conduit means 10 and is exhausted therefrom in the bottom thereof by a discharge conduit means 9.

Guiding screws 4 can be screwed into threaded openings in the supporting frame members 3 to adjust the compression force on the springs 6. When the valve 7 is shut, the valve element 5 is pressed toward the opening between the supporting members 3 by the hydrostatic pressure of the liquid in the working cell 1 and (if springs 6 are provided) by the pressure of the spring 6 acting thereon. An increase of the liquid volume obviously leads to an increase in the height thereof, and therefore the pressing force defined by the hydrostatic pressure $P_H$. By means of the screws 4, the second component of the pressing force $P_S$ can be changed as a result of the change in the degree of compression of the springs; this also changes the length of the path through which the valve element 5 may move between the supports 3 and the heads of the screws 4.

Upon the opening of the valve 7, the air pressure in the air cell 2 rises and as soon as the force $P_B$, which is dependent upon it and which acts upon the valve, becomes greater than $P_H + P_S$, the valve element 5 is raised and releases air through the gap formed between the valve element and the supporting frame members 3.

As the valve element 5 moves upwardly, the liquid beneath the valve and the liquid between the valve and the container walls are pushed upwardly in a vertical direction due to the entering of air from the cell and the formation of air-lift conditions. After a certain quantity of air has escaped through the open valve, the pressure in the air cell 2 drops and the valve element 5, under the action of the pressing force $P_H$ or $P_H + P_S$ depending on whether springs 6 are provided, descends into the position thereof shown in FIG. 1 so as to stop the escape of air from the air cell 2 into the working cell 1. Obviously the whole quantity of liquid, due to its own weight, moves downwardly.

This cycle is repeated because of the newly rising air presure in the air cell. The repeating of the cycle, i.e., the frequency of vibration depends upon the value of the pressing force $P_H$ or $P_H + P_S$. This is why the frequency can be controlled by changing the height H of the liquid in the working cell and the compressive force of the springs 6. As a result of the vibration of the valve element 5 and the periodic escape of air from the air cell 2 into the working cell 1, conditions for effective turbulence in the liquid occur in the working cell. This can considerably increase the mass and heat transfer between various parts of the liquid. The container which forms the working cell 1 and the air cell 2 may be of a variety of shapes. The number of valves having valve elements 5 also can vary and is determined by the horizontal area of the working cell.

Figure 3:
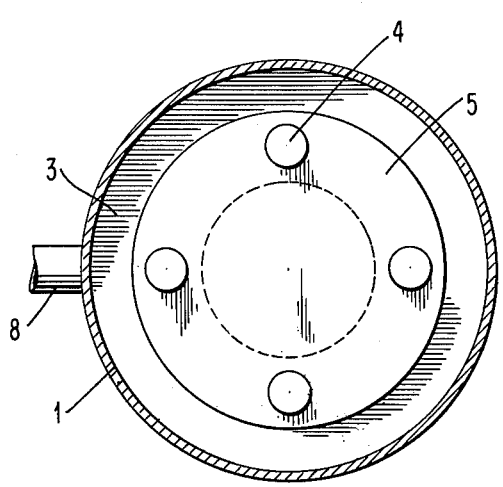
FIG. 3 is a view in plan of the valve of FIGS. 1 and 2.
Figure 4:
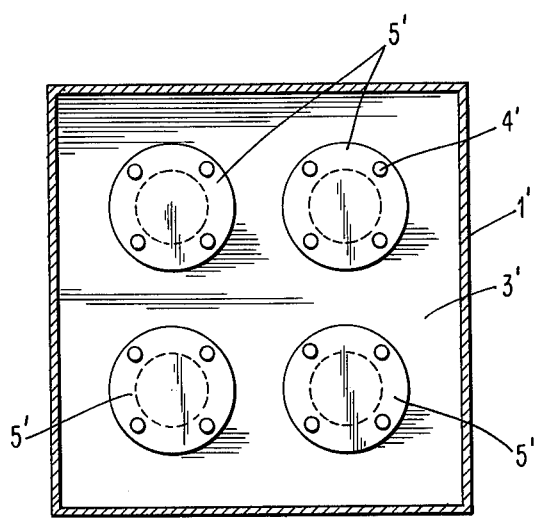
FIG. 4 is a view in plan of a support adapted to divide an air cell from a liquid or liquid-solid suspension material treating cell, such support carrying four valves similar to that shown in FIG. 3.

In FIG. 3 there is shown a working cell 1 with a round horizontal cross-section, cell 1 being provided with one valve having a valve element 5. In FIG. 4 there is shown a rectangular cell 1' which is provided with four valves having valve elements 5' mounted on adjusting screws 4' which in turn are secured to a square plate 3' which is of the same shape as the horizontal section of the cell 1'. The construction of the valve with valve element 5 which is shown in FIGS. 1 and 2 can be simplified by the removal of the spring 6. The hydrostatic force exerted by the liquid in the working cell is usually enough to attain an effective frequency and amplitude of the vibrations of the valve element 5.

The above-described pneumo-hydraulic vibrator can be used for solving a number of problems in the laboratory, as well as industrial and domestic problems, connected with heat and mass transfer. The vibrator is best illustrated in conjunction with its use in a number of processes now to be described.

Heating or Cooling of Pulp, Liquids or Suspensions

A number of processes in mineral processing and in chemical and food industries require fast cooling or heating of the liquid products. For example, in the flotation of oxide ores, pulp very often has to be heated before flotation; in the separation of copper-molybdenum ores, pulp has to be steamed; in the production of cheese, fast cooling after pasteurization is necessary, etc. The aforedescribed pneumo-hydraulic vibrator of the invention which is illustrated in FIGS. 1 and 2 can be used in all of these processes. It is only necessary to put the feeding pipe 9 at the lower end of the working cell, near to the valve element or elements 5, and to put the discharge pipe 10 at the upper portion of the vertical cell wall. It is possible to provide for opposite directions of the feeding of the air and liquid or liquid suspension. When heating is required, heated air has to be passed through the liquid media, and for cooling, cold air has to be passed through the liquid media. As a practical matter, water practically does not penetrate into the air cell 2. However, after a suspension has been treated and the vibrator has been switched off, some grains may remain between the valve element 5 and the supporting frame member 3. In such a case, some liquid may penetrate into the air cell. Because of this, it is advantageous to install a liquid discharge pipe at the bottom of the air cell. The occasional leakage of water into the air cell 2 is not to be considered as a disadvantage, since when the apparatus is switched off, such leak liquid will be supplied to the following step of the process.

Collection of Dust of Gases From Dusty Air

Figure 5:
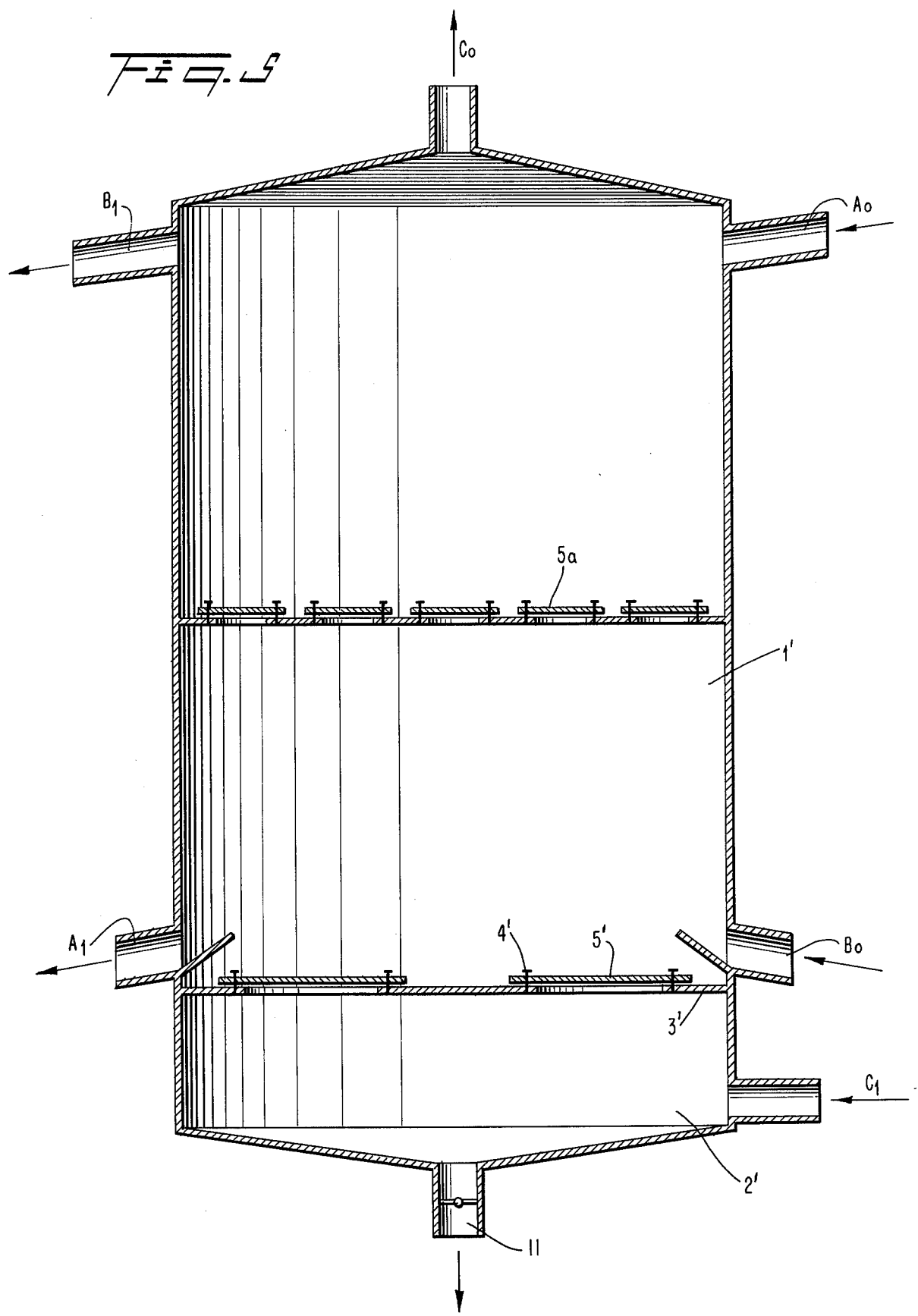
FIG. 5 is a similar schematic view in vertical cross-section of a second embodiment of material treating apparatus incorporating a plurality of pneumo-hydraulic self-vibrating devices in accordance with the invention, such apparatus being adapted, among other things, for extracting dust from dusty air.

An illustrative embodiment of an apparatus for carrying out this process is shown in FIG. 5. In such figure parts which are similar to those shown in FIGS. 1 and 2 are designated by the same reference characters with an added prime ('). Dusty air is delivered to an air inlet conduit means $C_1$ to flow into the air cell 2' from which it passes through lower valves having movable valve elements 5' when the air pressure builds up sufficiently. The entry of air into the working cell 1' from the air cell 2' automatically generates vibrations of the valve elements 5'. The liquid dust removing medium, which may be water, in the working cell 1' is brought into a state of turbulence by the thus-uprushing air which thereby cleans it of impurities. The cleaned air leaves the cell 1' through an upper air discharge conduit means $C_0$. With respect to the water, the flow of water may be discontinuous or continuous. When the process is discontinuous, clean water is periodically fed into the working cell 1' and dirty water is removed therefrom. When the flow of water is continuous, clean water is continuously supplied to the working cell through an inlet conduit means $B_0$ at the lower right-hand corner of the apparatus, such water being discharged through a water discharge conduit means $B_1$ at the upper left-hand corner of the working cell.

There may be direct current water flow (the same direction of flow of the gas and the liquid), i.e., water comes into the lower end of the cell 1' and leaves it through the upper end (direction $B_0 - B_1$), or countercurrent water flow (gas and water move in opposite directions, gas moving in the direction $A_0 - A_1$, and water moving in the direction $B_0 - B_1$). The direction of water flow effects the cleaning efficiency of the apparatus.

In particularly difficult cases (finely dispersed hydrophobic dust), the efficiency of the apparatus can be improved by the use of two or more vertically spaced layers of pulsating valves arranged in horizontal partitions in the working cell 1', as shown in FIG. 5. In the lower part of the cell, dividing it from the air cell 2', there is a partition made up of supports and two vertically vibrating first valve elements 5', and, spaced somewhat thereabove, a second partition likewise formed of a horizontal partition spanning the side walls of the working cell and containing a plurality of second, smaller vibrating valve elements 5a. Any additional pipes for feeding and discharging of water, which may be desirable with such arrangement, are not shown in the drawing. It is suitable to feed the air cell 2' with water, dusty air being led to it through a tangentially disposed inlet conduit $C_1$. Coarse dust, after having been captured, is led out through a discharge conduit means 11 disposed at the bottom of the air cell, such conduit means having a selectively operated valve interposed therein.

Figure 6:
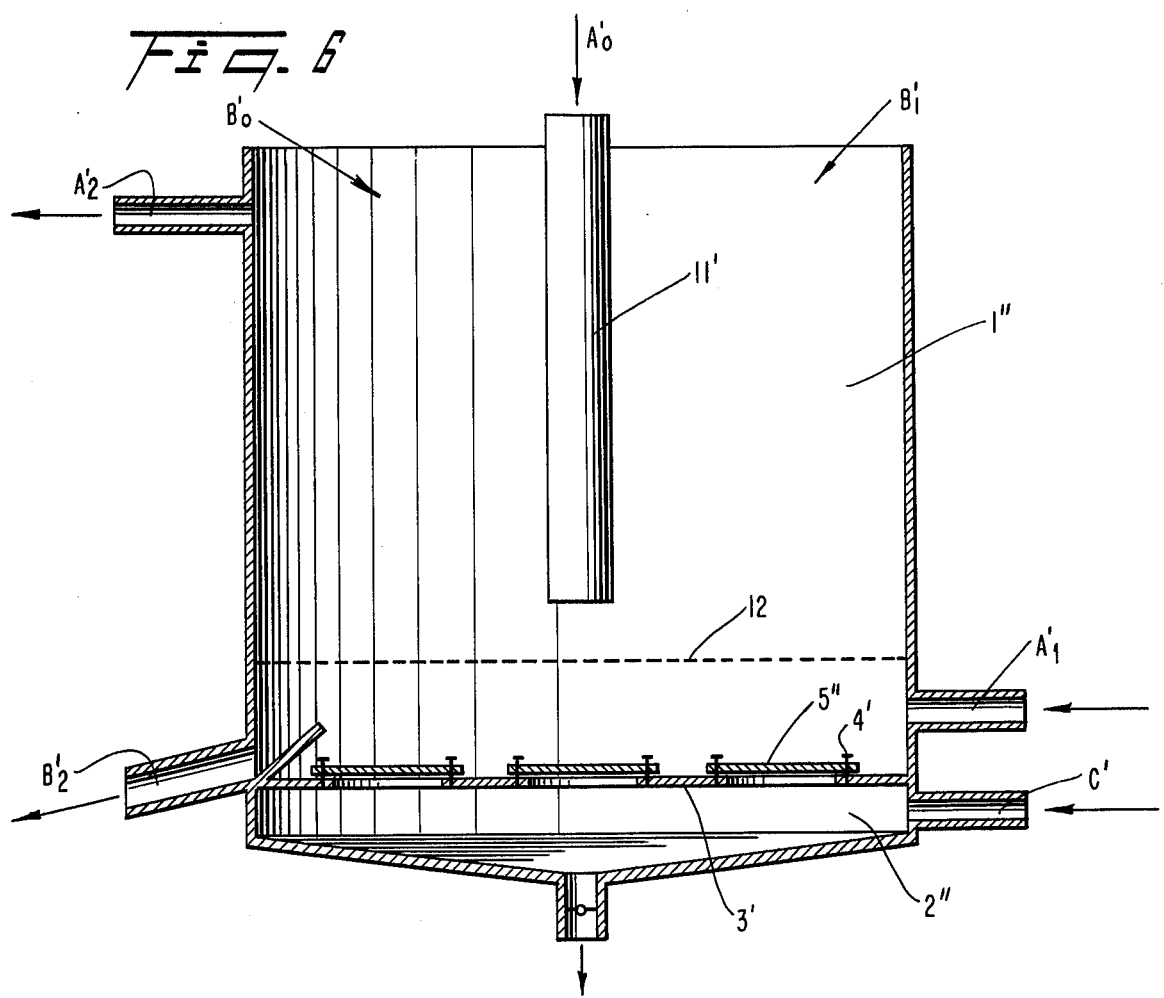
FIG. 6 is a schematic view in vertical cross-section through a third embodiment of apparatus in accordance with the invention, such apparatus being a chemical reactor.

Chemical Reactor For Universal Purposes — Preparation of Pulps For Flotation, Discharging of Reagents, Paints and Other Substances, Liquid Mixing, Etc., Cementation, Activation of Copper-Containing Solutions, and Activation of Bacterial Leaching In FIG. 6 there is shown a preferred embodiment of apparatus for use for the above purposes. In such figure parts which are similar to those shown in FIG. 5 are designated by the same reference characters with an added prime ('). When relatively coarse-grained material is being processed, the material generally indicated as $A'_0$ is fed downwardly through a central pipe 11 onto a screen 12, the solvent being supplied through an inlet conduit means $A'_1$, disposed to discharge beneath the screen 12. The screen 12 is not necessary when dissolving fine-grained material. The discharge of liquid or liquid suspension from a working cell 1'' takes place through a discharge conduit means $A_2$, disposed adjacent the upper end of the cell. Easily soluble materials can be delivered from the top downwardly into the cell in the direction $B'_0 - B'_1 - B'_2$. In the same way, there may be supplied liquids, paints, solvents, etc., for mixing in the working cell 1''.

Pulps, prepared through flotation, can be passed through the reactor and agitated by corresponding reagent in appropriate directions. Both directions $B'_1 - A'_2$, and $A'_1 - A'_2$, $B'_1 - B'_2$ are suitable. Pulp agitation by air is recommended because of the additional effect of the respective gases from the air.

Figure 7:
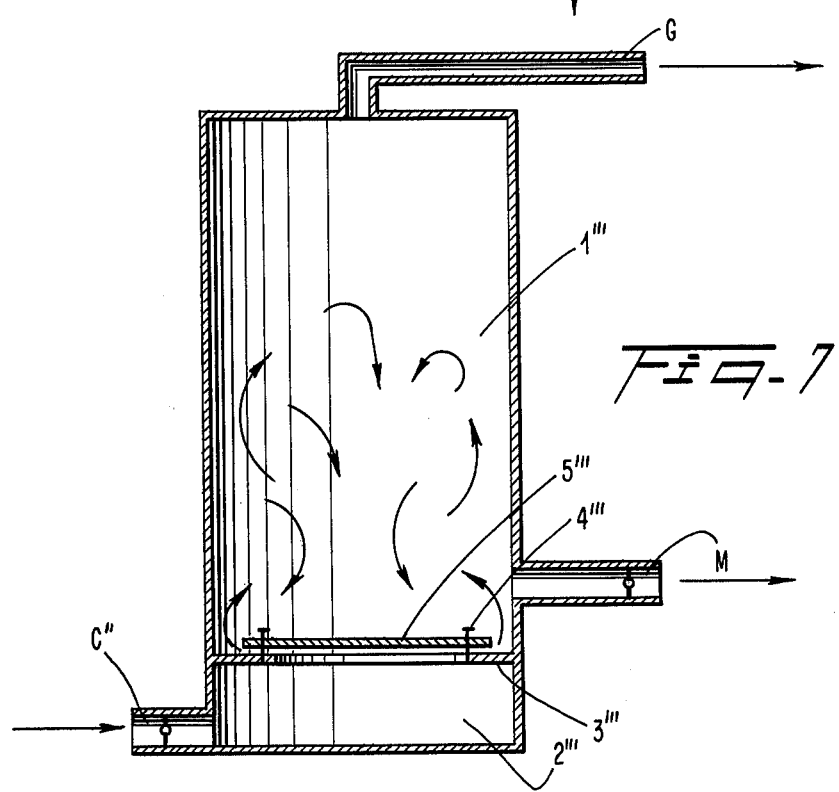
FIG. 7 is a schematic view in vertical cross-section through an apparatus for stirring material or for use for domestic purposes, such as in a vacuum cleaner.

In FIG. 7 there is shown an embodiment of an apparatus which may be used for domestic purposes, for example, stirring. Materials to be stirred are supplied to the working cell 1''' which then is shut by a cover provided with a conduit means G adapted for connection with a source of reduced pressure. Air is led into an air cell 2''' through a conduit means C'', and the stirred material is discharged through a conduit means M. The apparatus shown in FIG. 7 may be used to advantage with domestic vacuum cleaners, the cell 1''' being connected with the low pressure or vacuum side of the cleaner. Stirred materials may be discharged from the upper end of the cell 1''' if they have a high viscosity and do not flow easily; otherwise, the stirred material, as above-disclosed, are removed through the discharge conduit means M when such material flows easily.

In FIG. 8 there is shown a column flotation machine with a pneumo-hydraulic vibrator. In such apparatus, air enters an air cell 2b through an air entry conduit means Cb, the air periodically entering the lower end of the working cell 1b through the valve provided with the vibrating valve element 5b. Pulp enters the working cell through an inlet conduit Db, disposed intermediate the height of the cell. Water is introduced into the upper end of the cell through a water inlet conduit means Bb. Unwanted heavy impurities are discharged from the cell 1b through the discharge conduit means Q disposed at the lower end of the working cell. The floated pulp product is discharged from the upper end of the flotation column through a discharge conduit 14b.

Washing Devices For Domestic and Industrial Purposes

Turbulent currents formed above the valve or valve elements 5 of the pnuemo-hydraulic vibrator cause favorable conditions for washing different dirty objects. This process can be carried out in a number of different apparatus in accordance with the invention, a preferred embodiment of such apparatus being shown in FIG. 9, wherein parts which are generally similar to those shown in FIGS. 1 and 2 are designated by the same reference characters with an added postscript "e."

Above the valves provided with vibrating valve elements 5e there is disposed a grid in the form of a vessel having perforated walls and bottom, such vessel serving as a support for different changeable containers. Such containers may be formed in a manner suitable to their particular use, such as the washing of household appliances, dishes, fruits, etc. In the first case, the container, if formed like those in existing dishwashers, provide for the vertical arrangement of plates to be washed. For the washing of fruit, a perforated vessel is placed over the supporting grid 15. For the washing of cloth, a simple grid without sharp edges is sufficient. This device is expecially convenient for the washing of cloth which may be easily torn in mechanical washers. When materials are to be washed or the device of the invention is used in household appliances, these materials are placed just above the supporting grid. Of course, in each case a suitable washing liquid or detergent should be used. The space around the vibrator serves for collecting coarse impurities which have been removed from the objects being washed. For domestic purposes, the washing device can be supplied with air by means of an ordinary vacuum cleaner. It is possible, however, to make the unit independent, attaching to it an air blower of the type used in vacuum cleaners, the output of such blower being connected to the air inlet port Ce for the air cell 2e.

Mode of Operation

The air pressure in the air cell in all of the afore-described embodiments depends on the hydrostatic pressure of the liquid or liquid-solid material suspension in the working cell with which the air cell coacts. The pressure of the pressurized air which is fed into the air cell is therefore also dependent on the aforementioned hydrostatic pressure. For example, if the hydrostatic pressure is 0.1 kg per square meter and the valves 5' are not provided with springs 6, it suffices if the air pressure in the air cell is 20 – 30% higher than the hydrostatic pressure in the working cell to assure a correct functioning of the pneumo-vibrator of this invention.

The frequency of valve vibrations under such conditions ranges from 25 to 150 vibrations per second and depends on the total of the pressures acting on the valves and on the pressure and quantity of pressurized air introduced in the air cell. The amplitude of the vibrations of the valves varies from 0.5 to 4 mm and again depends on the pressure and quantity of the pressurized air introduced into the air cell.

EXAMPLES

The Examples presented hereinbelow are illustrative of materials that have been treated with a device in accordance with the present invention. Such Examples are not intended to limit the invention specifically thereto.

EXAMPLE 1

A liquid-solid material suspension of lead-zinc-copper pulp ore having 4.2 wt % lead, 2.1 wt % zinc and 0.24 wt % copper is introduced into the working cell where it is mixed with flotation reagent and where it is subjected to air oxidation by air coming from the air cell. By utilizing a device in accordance with this invention, as compared to a mechanical mixing device, the extraction rate is improved by 2.2% for lead, 1.3% for zinc, and 4.8% for copper. The autovibrating agitator or valve means vibrate at a frequency of 58 hertz and at an amplitude varying from 1 to 2.4 mm.

EXAMPLE 2

Coal slime, having a particle size up to 1 mm and an ash content of 26.7 wt % is fed into the working cell in order to enrich the coal slime by flotation. This flotation is carried out in an autovibrating flotation chamber, wherein the valve element vibrates at a frequency of 112 hertz and a valve amplitude of 0.5 to 2.1 mm. When comparing the aforedescribed method and apparatus with a conventional mechanical flotation device, the flotation time is reduced from 4.2 to 2.5 minutes without changing the concentrate output (68 wt %) and by even lowering the ash content of the slime from 12.8 wt % to 10.9 wt %.

EXAMPLE 3

Coal, having particle sizes of 3 - 12 mm, in the form of a liquid suspension, is fed to be gravitationally enriched. This is carried out in the autovibration flotation chamber of this invention by subjecting the valve to a 75 hertz frequency vibration and an amplitude of vibration of about 5 mm. A concentrate having an ash content of 10.2 wt % is obtained from the initial coal liquid suspension having an ash content of 25.4 wt %.

Although the invention is illustrated and described with reference to a plurality of preferred embodiments thereof, it is to be expressly understood that the invention is in no way limited by the disclosure of such a plurality of embodiments, but is capable of numerous modifications within the scope of the appended claims.

What is claimed is:

1. In an apparatus for treating liquids and liquid suspensions including a working chamber adapted to hold liquid, and an air chamber adapted to hold pressurized air at least partially contiguous to said working chamber, the improvement comprising wall means separating said air chamber and working chamber, said wall means having at least one aperture, a valve element operatively mounted on said wall means and adapted to vibrate so as to alternately open and close said aperture, said liquid in said working chamber exerting a predetermined hydrostatic pressure on said valve element in a first direction to close said aperture, said pressurized air in said air chamber exerting a pneumatic pressure on said valve element in a second direction to open said aperture, said hydrostatic and pneumatic pressure in said working and air chambers and the existing gravitational forces exclusively producing the driving forces which cause said valve element to vibrate.

2. In an apparatus for treating liquids and liquid suspensions including a working chamber adapted to hold liquid and an air chamber adapted to hold pressurized air at least partially contiguous to said working chamber, the improvement as set forth in claim 1, said working chamber is disposed above said air chamber and said valve element vibrates in a vertical plane.

3. In an apparatus for treating liquids and liquid suspensions including a working chamber adapted to hold liquid and an air chamber adapted to hold pressurized air at least partially contiguous to said working chamber, the improvement as set forth in claim 2, including means for guiding said valve element for vertical movement with respect to at least a portion of said wall means.

4. In an apparatus for treating liquids and liquid suspensions including a working chamber adapted to hold liquid and an air chamber adapted to hold pressurized air at least partially contiguous to said working chamber, the improvement as set forth in claim 3, including a source of pressurized gas, conduit means between said source of pressurized gas and said air chamber and adapted to place said source of pressurized air in fluid communication with said air chamber, valve means operatively mounted in said conduit means and adapted to regulate the pressurized air flow to said air chamber.

5. In an apparatus for treating liquids and liquid suspensions including a working chamber adapted to hold liquid and an air chamber adapted to hold pressurized air at least partially contiguous to said working chamber, the improvement as set forth in claim 4, wherein said valve element vibrates at a frequency of 25 to 150 vibrations per second.

6. In an apparatus for treating liquids and liquid suspensions including a working chamber adapted to hold liquid and an air chamber adapted to hold pressurized air at least partially contiguous to said working chamber, the improvement as set forth in claim 5, wherein the vibrations of the valve element have an amplitude ranging from 0.5 to 4 mm.

* * * * *